Nov. 3, 1964  S. HANSEN ETAL  3,155,592
FUSION REACTOR
Filed Aug. 19, 1960
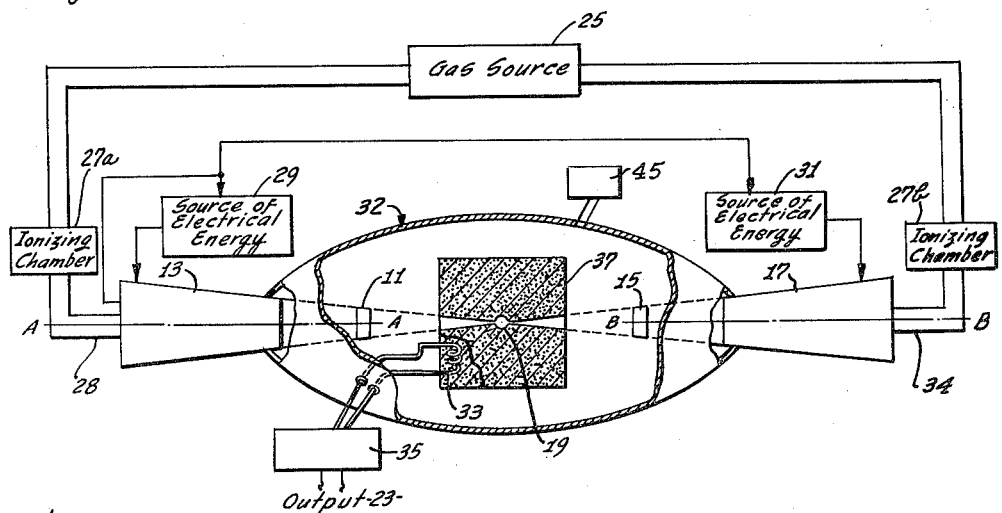
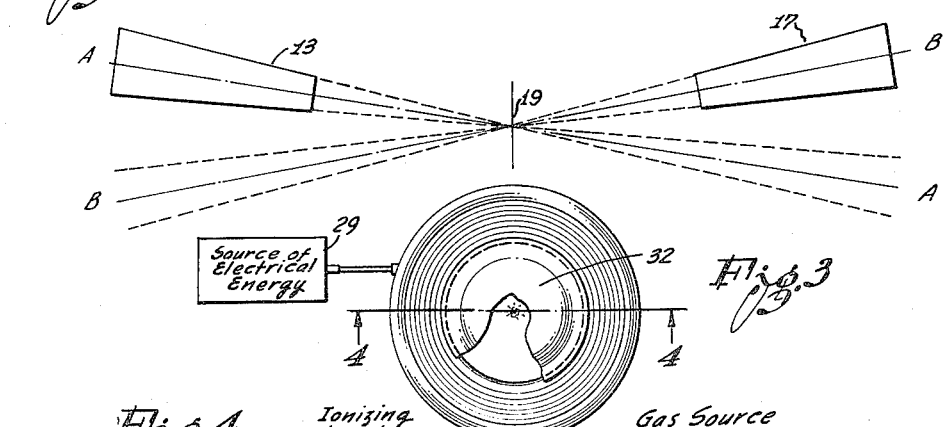
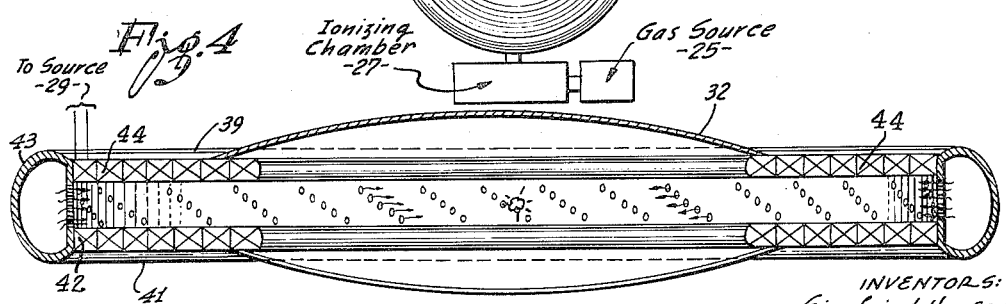
INVENTORS:
Siegfried Hansen
Giusto Fonda Bonardi
By Richard K. Ehrlich
Attorney

United States Patent Office 3,155,592
Patented Nov. 3, 1964

3,155,592
FUSION REACTOR
Siegfried Hansen and Giusto Fonda Bonardi, Los Angeles, Calif., assignors to Litton Systems, Inc., Beverly Hills, Calif.
Filed Aug. 19, 1960, Ser. No. 50,610
10 Claims. (Cl. 176—1)

The present invention relates to a nuclear fusion reactor and more particularly to a nuclear fusion reactor using accelerated gaseous plasma masses directed along collision courses whereby the plasma masses collide in a predetermined collision area.

Because of the anticipated exhaustion of fossil fuels (i.e., coal, oil, natural gas), commonly used for power, and because of the limited supply and hazards of use of fissionable fuels, recently much attention has been directed to the problem of developing a nuclear fusion reactor. It is clear that such a reactor could provide a solution to the world's power problems since one of the basic fusion fuels is deuterium or heavy hydrogen which is contained in the oceans in inexhaustible amounts. Furthermore, a fusion reactor would be inherently stable and not subject to explosion. Hence, if fusion reaction can be made to yield useful power, it will solve forever the earth's fuel supply problem.

While it is well known that both the sun and other stars have for billions of years generated vast amounts of energy through thermonuclear fusion reactions, whether such a fusion reaction can be produced on earth to generate useable power is a totally different problem. In referring to the difficulties involved in mechanizing a thermonuclear fusion power plant, Dr. Richard F. Post of the University of California radiation laboratories has stated, "It is undoubtedly the most difficult project ever presented to scientists and engineers."

It was discovered at an early date that a proton could be caused to break through the nuclear electrotatic repulsion forces of a light nucleus to form a heavier nucleus, the fusion process resulting in the release of energy in accordance with the famous Einstein Theory. However, in order to achieve the fusion of one proton, it has been found necessary to accelerate literally thousands of protons since the probability of a proton fusing with a light nucleus is extremely small. Thus, while the energy released by the fusion of a proton is substantially greater than the energy utilized to accelerate that proton, the energy is far less than the total energy utilized to accelerate the fusing proton as well as the thousands of protons which do not undergo fusion. Hence, this method of producing a fusion reaction is of no importance in mechanizing a useful power reactor since the energy necessary to achieve fusion is greater than the energy released by the fusion reaction.

It should be noted that one of the reasons for the small probability of proton fusion is that most of the proton energy is exhausted ionizing target atoms along the path of the proton so that in most cases, the velocity of the proton is reduced below the level necessary for fusion before it has an opportunity to strike one of the target nuclei.

Examining generally what is necessary to obtain a thermonuclear fusion reaction of a useful type, or in other words, one that produces more energy than it uses, it must be realized that the fuel which is to be used in the reaction must be raised to an ignition point or in other words, the nuclei of the fuel must contain sufficient energy so that they will collide with sufficient violence to stick together or fuse. One of the basic problems is that this ignition point is equivalent to hundreds of millions of degrees centigrade. This presents great difficulties. Referring to the ignition point of a specific fuel, for example, deuterium or heavy hydrogen which is a most attractive fuel in that it is contained in ordinary water, it can be theoretically shown that if one starts with a mass of deuterium gas plasma at standard temperature and pressure and raises the temperature of the mass to 100 million degrees some deuterium atoms can be made to fuse thereby releasing energy. It should be noted that at this temperature the pressure of the mass, if held in the same volume, will be 22 million pounds per square inch. However, at this temperature and pressure, the reaction is still not self-sustaining, the reaction becoming self-sustaining at about 350 million degrees centigrade.

Upon considering the foregoing, two facts become evident. One is that if the energy necessary to sustain a fusion reaction is to be introduced into a plasma by means of the random motion of the plasma nuclei, or in other words, by raising the temperature of the plasma, the pressure of the plasma at standard temperature must be on the order of one ten-thousandths of an atmosphere in order that at 350 million degrees the pressure of the gas will be within controlable bounds. It is clear, however, that working with gases at such low pressures involves the solving of numerous difficult problems. Secondly, it is clear that the walls of any container used to contain the plasma cannot be maintained at or near the temperature of the plasma since no material known to man would remain in a liquid or solid state at that temperature. On the other hand, if the walls of the container are not maintained at or near the temperature of the plasma, it is clear that the particle energy of the nuclei of the plasma will be dissipated, thus quenching the reaction, whenever quantities of plasma particles strike the container walls, so that a continuous fusion reaction could not be maintained.

It has occurred to a number of scientists that the problem of confining a very hot gas within a material chamber without allowing any appreciable amount of the gas to reach the chamber walls could be solved by confining the plasma within a magnetic field which would keep the plasma particles away from the container walls. According to the most prominent theory, if a gas plasma fills a donut-shaped tube and a magnetic field is generated which induces a current within the plasma which is directed circumferentially around the tube, the current set up within the plasma will produce a strong toroidal shaped magnetic field in the plasma which pinches or compresses the donut-shaped plasma ring so that it does not contact the walls of the hollow tube container.

Prior art experimentation along the foregoing lines has uncovered a number of serious difficulties in attempting to mechanize a thermonuclear reactor in accordance with the theory. For example, because the plasma must be of such relatively low density, the nuclei of the plasma have a substantially long means free path between collision and thus it is required that the confinement or pinch period be maintained for as long as ten seconds to produce a thermal fusion reaction. However, it has been found through experimentation that, while a plasma can be pinched or compressed according to the theory, the pinch lasts only a few millionth of a second, the plasma ring then twisting or snaking violently and finally driving itself into the tube wall. Furthermore, it was discovered that the tighter the pinch compression, the faster was the twisting and eventual destruction of the pinch effect. Thus, is has been impossible to maintain a column pinched sufficiently long to obtain a self-sustaining thermonuclear fusion reaction. Hence, the prior art is devoid of a useful fusion reactor capable of producing an energy output in excess of the energy input.

The present invention overcomes the foregoing and other numerous prior art problems involved in the mechanism of a power fusion reactor by ultilizing an electrically neutral, unconfined, high density gas plasma at relatively low temperatures to produce output energy from fusion between plasma particles which is substantially in excess of the input energy. In accordance with the concepts of the present invention, a high translational velocity is imparted to a plasma mass by an accelerating apparatus, the plasma thereby obtaining sufficient energy for fusion rather than by imparting random thermal motion to the plasma particles as in the attempted prior art thermonuclear reactors. More particularly, since the reactor of the invention is not thermonuclear, the uncontrollable pressures encountered with high temperature thermal motion are avoided. Therefore, a relatively small inward directed velocity imparted to the plasma by the accelerating apparatus is sufficient to converge the plasma after leaving the accelerating apparatus to a small mass having a high frontal area density without the application of any external forces.

In one embodiment of the invention, a pair of accelerators are oriented with respect to one another to project a pair of first and second plasma masses, respectively, having toroidal shapes with predetermined but oppositely directed velocities to collide at or near a collision point, the predetermined velocities being determined such that the relative velocity of one plasma with respect to the other is sufficient to insure fusion upon collision. The probability of collision between particles is, of course, great because of the high frontal area density of the plasmas.

While a number of known fusion fuels can be used in this embodiment, deuterium and tritium are preferable since they require a minimum amount of energy so that the predetermined velocities can be kept to a minimum. Furthermore, in accordance with this embodiment, each of the plasma masses includes equal amounts of deuterium and tritium so that the total weight of the first plasma is equal to that of the second plasma. It should be noted that plasma masses of equal weights are advantageous in that the two accelerators can be of identical design. Furthermore, where the consistency of the first plasma is equal to that of the second plasma, the plasma masses can be recovered after passing the collision point and fed back to the accelerators whereby a recirculating plasma system can be achieved, additional amounts of plasma being added to the system to compensate for the deuterium and tritium ions which undergo fusion.

It should also be noted that, while the probability of deuterium-tritium collisions may be somewhat reduced because of the use of plasmas having both deuterium and tritium therein, the deuterium-tritium collision event must also compete with deuterium-deuterium and tritium-tritium collisions. The foregoing described advantages generally outweigh this limitation.

The first and second accelerators are connected to a source of deuterium and tritium gas through a pair of ionizing chambers which ionize the gas to produce a plasma mass, one of the ionizing chambers being associated with the first accelerator and the second being associated with the second accelerator. The first and second accelerators accelerate and discharge the plasmas directed along a pair of first and second accelerating axes, respectively, the accelerators being positioned so that the accelerating axes are collinear whereby the oppositely directed plasmas collide at the collision point.

In accordance with the invention, the deuterium nuclei of one plasma mass and the tritium nuclei of the other plasma mass are accelerated so that there is imparted thereto sufficient energy to allow them, upon collision, to fuse and form helium 4 and a neutron. Furthermore, radially inward velocities are imparted to the toroid shaped masses so that they converge to have small cross-sectional frontal areas by the time they reach the collision point so that the frontal density or, in other words, the number of particles along the length of the plasma and behind the frontal area is high. Accordingly, the probability of collision between plasma particles is also high. Therefore, since the number of collisions is high relative to the number of particles accelerated, the energy released is substantially greater than the energy used to accelerate the plasma.

Approximately 80% of the energy released by the fusion reaction is carried off from the collision area by the fast moving escaping neutrons while the remainder of the energy is carried off by the fast moving charged helium ions and electrons. The energy carried off by the escaping neutrons is transformed into useful energy by trapping the fast neutrons in a suitable shield such as graphite whereby the power is converted to heat which can then be converted by means of conventional apparatus to electrical power. The remaining energy produced by the reaction can be converted to electrical power directly by surrounding the collision area with a field coil, the charged helium ions and the electrons inducing a voltage thereon while the path and speed of the neutrons is unaffected.

According to a second embodiment of the invention, a pair of accelerators are oriented such that their accelerating axes are not collinear but intersect at a collision point.

In still another embodiment of the present invention, an annular-shaped accelerator is utilized for accelerating an annularly-shaped ionized gas or plasma mass positioned within the accelerator and concentric therewith in such a manner that the annular-shaped mass collapses or converges toward its own center. More particularly, the accelerator includes a pair of annular plates having a circular manifold positioned between and adjacent the peripheries of the plates for introducing ionized gas peripherally between the annular plates. The plasma positioned between the plates is then directed uniformly toward the center of the accelerator with a substantial velocity by accelerator operation whereby oppositely placed particles of the annular plasma collide at the center of the accelerator with sufficient relative velocities to fuse.

It is, therefore, an object of the present invention to provide a fusion power reactor.

It is another object of the present invention to provide a power reactor wherein two electrically neutral groups of particles are hurled against one another with sufficient translational velocity so that upon collision the particles of the different groups undergo fusion.

It is a still further object of the present invention to provide a nuclear fusion reactor including two or more plasma accelerators capable of accelerating two or more plasma masses to collide within a collision area, the plasma being accelerated to predetermined velocities which are sufficient to impart to the nuclei of the plasmas sufficient energy to permit the nuclei of the different plasma masses to fuse with one another.

It is another object of the present invention to supply to a pair of plasma nuclei sufficient energy to fuse through relative translational motion of one nucleus relative to the other rather than through random thermal motion produced by high temperatures.

It is a further object of the present invention to fuse relatively cold plasma particles.

It is still another further object of the present invention to provide a nuclear fusion reactor wherein deuterium nuclei collide with tritium nuclei to form helium and fast neutrons.

It is a different further object of the invention to provide a fusion reactor wherein deuterium nuclei collide with each other to form helium nuclei and tritium nuclei.

The novel features which are believed to be characteristic of the invention both as to its organization and method of operation, together with further objects and advantages thereof, will be better understood from the following description considered in connection with the accompanying drawings, in which several embodiments of the invention are illustrated by way of example. It is to be expressly understood, however, that the drawings are for the purpose of illustration and description only, and are not intended as a definition of the limits of the invention.

FIGURE 1 is a partly block, partly schematic diagram of a preferred embodiment of the invention;

FIGURE 2 is a diagrammatic illustration of a second embodiment of the invention; and FIGURES 3 and 4 are top and sectionalized side views of a third embodiment of the invention.

Referring now to the drawings, wherein like or corresponding parts are designated by the same reference character throughout the several views, there is shown in FIGURE 1 a partly block and partly schematic diagram of a preferred embodiment of a fusion reactor according to the invention wherein a deuterium-tritium gaseous plasma mass 11 which contains nearly equal numbers of positive as well as negative charges and hence is electrically neutral, is convergently discharged from an accelerating structure 13 with a velocity directed toward another deuterium-tritium gaseous plasma mass 15 which is also electrically neutral and convergently discharged from an accelerating structure 17, the plasma masses 11 and 15 colliding within a predetermined collision area 19 with sufficient relative energy for the deuterium nuclei of plasma 11 to fuse with the tritium nuclei of plasma 15, and vice versa, to form helium 4 nuclei and neutrons as well as releasing substantial amounts of energy. The energy released by the fusion reaction is transformed into electrical energy and presented at an output terminal 23 by means of a graphite shield 37, heat exchanger 33, and a steam operated electrical generator 35, whereby the energy may be transported and utilized by means of conventional prior art electrical techniques.

Considering the overall operations of the fusion reactor more carefully, a gaseous mixture of deuterium and tritium in substantially equal amounts from a gas source 25 is applied through a pair of ionizing chambers 27a and 27b to accelerating structures 13 and 17. More particularly, the ionized gas or plasma from ionizing chamber 27a is applied to an input 28 of accelerating structure 13 while the plasma from ionizing chamber 27b is applied to input 34 of accelerating structure 17.

Accelerating structure 13 operates on the applied ionized deuterium-tritium gas upon actuation by a plurality of electrical signals from a source of electrical energy 29 to accelerate the plasma along an accelerating axis, A—A, to discharge the plasma at the accelerating structure discharge aperture as plasma pulse 11 having a predetermined first translational velocity. Accelerating structure 17 similarly operates on the applied ionized deuterium-tritium plasma upon actuation by a plurality of electrical signals from a source of electrical energy 31 to accelerate the plasma along accelerating axis B—B, charge the plasma at the accelerator discharge aperture as plasma 15 having a predetermined second translational velocity is equal in magnitude but opposite in direction to the first predetermined velocity, the predetermined velocities being sufficient to impart to the nuclei of the plasma masses sufficient relative energy to fuse the nuclei when they collide at or near the collision point.

Furthermore, as each plasma mass is accelerated along its respective accelerating axis, radially inward directed velocities are imparted to the plasma particles whereby the plasma becomes annular or ring-shaped and tends to converge in size. This tendency of each annular plasma to converge continues after the plasma mass is discharged so that each plasma mass converges to a body having an extremely small frontal area.

Referring now with particularity to accelerating structures 13 and 17, attention is directed to U.S. Patent No. 2,992,345, entitled "Plasma Accelerators," issued to Siegfried Hansen on July 11, 1961, wherein the operation and structure of these components are described in detail. As described in U.S. Patent No. 2,992,345, each of the accelerating structures includes a series of field coils or windings which are wound around the accelerating axis of the accelerating structure and are sequentially positioned starting at the input of the accelerating structure and continuing to the accelerating structure discharge aperture. In operation, the field windings of each accelerating structure are sequentially energized by the electrical signals from the corresponding source 29 or 31, whereby an extremely strong magnetic field is first generated around the field coil winding adjacent to the input of the accelerating structure and then around each of the remaining field windings in sequence and in accordance with a predetermined accelerating schedule. Hence, a magnetic field is generated which accelerates through the accelerating structure from the input to the discharge aperture along the accelerating axis.

Furthermore, the accelerating structure includes a mechanical shutter for passing bursts of gas into the input area of the accelerator so that the accelerating magnetic field will pick up the bursts of gas and accelerate them to the predetermined velocities at the accelerator output. As is described in the above-mentioned U.S. patent, the mechanical shutter includes a rotating metallic disk which has one or more apertures therein which allow gas into the input area when the disk has an angular position within a preselected zone. As is described in the U.S. patent, a transducer is utilized to generate electrical signals which are applied to a pulse forming network within the sources of electrical energy to clock the generation of the magnetic field with the passing of the bursts of gas into the input area.

As is indicated in FIGURE 1, in the embodiment of the invention shown therein the transducer of accelerating structure 13 is utilized to clock both accelerating structures 13 and 17. In this regard, it should be noted that the disks of the two accelerating structures should be kept in rough synchronism so that when the transducer is actuated the angular positions of both disks will be within their respective preselected zones.

Considering now the effects of the accelerating magnetic field upon the plasma mass in the accelerating structure, it should be noted that since the plasma has a high conductivity it has a circulating electrical current induced therein in response to the magnetic field, which will, in turn, react with the movement of the accelerating magnectic field in substantially the same manner as does the rotor of an induction motor by following after the advancing field. Inasmuch as the magnetic field is accelerating rather than moving at a constant velocity, the plasma is accelerated as it advances in the accelerating structure, the velocity of the plasma slipping or falling behind slightly with respect to the field velocity to thus induce a current within the plasma and thereby maintain the ionization of the plasma.

It should also be noted that the current induced in the plasma also produces additional effects. For example, the current will generate a toroidal-shaped magnetic field of its own surrounding the plasma which will react with the annular turn in the plasma to conform the plasma to a ring or annular shape and which further tends to pinch or decrease the cross-sectional area of the plasma ring. This phenomenon will be recognized by those familiar with plasma physics as the well-known "Pinch Effect" and is utilized in the present invention to cause the annular plasma ring to converge to a body having an extremely small frontal area at the collision point. In addition, the current flowing in the plasma ring causes interparticle collision within the plasma which serve to maintain the ionization of the plasma ring as it is accelerated through the accelerator thereby insuring excellent conductivity.

Considering now the magnitude of the plasma velocity at discharge, it should be noted that the probability of an undersirable scattering collision decreases rapidly as the relative velocity between particles increases. On the other hand, the probability of a fusion type collision increases to a resonant peak and then falls off rapidly.

In the case of the D–T (deuterium-tritium) reaction, this resonant peak occurs when the total energy of the two colliding particles is 10 kev.

Continuing with the discussion of the invention, it can be shown analytically that in the case of deuterium ions or deuterons colliding with tritium ions or tritons, the relative velocity of the deuterons should be $3.24 \times 10^8$ cm./sec. in order that the colliding nuclei be at the 110 kev. level. It is clear, of course, that this velocity can be divided equally between the two plasma masses so that the discharge or output velocity of each plasma mass may be $1.62 \times 10^8$ cm./sec. which velocity is well within the range of the Hansen plasma accelerator as will be hereinafter more fully discussed. It is also clear from basic physics that only half as much energy is needed to accelerate both plasmas to $1.62 \times 10^8$ cm./sec. than is necessary to accelerate one to $3.24 \times 10^8$ cm./sec. Hence, a definite economy of energy can be obtained by accelerating both plasmas to the same speed.

In order to insure the occurrence of a fusion reaction, the fusion collision event must be favored while the effects of competing events such as ionization and scattering collisions as well as electromagnetic radiation must be minimized. In the present invention, ionizing collisions are avoided since the plasmoids or plasma masses leave the accelerators in a highly ionized state as a result of the acceleration process and no appreciable recombination can occur in the short time the plasma masses experience free flight to the collision area. Scattering collisions with ambient gases are avoided in the referenced embodiment by enclosing the plasma paths and the collision areas with a partially evacuated vessel or chamber 32, which includes a pump 45 for continually maintaining the evacuated condition of the vessel.

Considering the fraction of colliding ions which undergo fusion, it should be noted that if N represents the total number of nuclei or ions in each plasma mass, $A_f$ represents the frontal area of the plasma mass, $A_{cf}$ the collision cross-section for fusion events, and K the fraction of colliding ions which undergo fusion, than:

$$\frac{N}{A_f} = \frac{K}{A_{cf}} \qquad (1)$$

or, in other words, the particle density $$\frac{N}{A_f}$$

is equal to the percentage of resulting fusion events divided by the fusion cross-section.

Therefore, the frontal area desity needed for any desired fusion collision percentage can be determined when it is realized that at the 110 kev. energy level, the effective target area of a deuterium ion with respect to a fusion collision or interaction with an oncoming tritium ion is $5 \times 10^{-24}$ cm.$^2$ or 5 barns. Therefore, if it is assumed that a 5% efficiency is desired, it is seen from Equation 1 that the particle density $$\frac{N}{A_f}$$

should be $10^{22}$ particles per cm.$^3$. If the acceleratiing structures are adjusted to accelerate a pair of plasma masses each having $10^{20}$ particles therein, it is clear that if the plasma mass is considered as having a generally cube shape the frontal area, $A_f$ shall be:

$$\frac{10^{20}}{A_f} = 10^{22} \qquad (2)$$

$$A_f = .01 \text{ cm.}^2 \qquad (3)$$

As has been hereinbefore discussed, the nuclei of the plasma masses can be compressed to the foregoing density by the inwardly directed radial velocity imparted to the plasma masses by the accelerators. It can be easily shown that in order to achieve a compression of this magnitude the inwardly directed radial velocity of the plasma masses should be equivalent to 3.0 electrons volts in order to overcome the electrostatic forces of the particles, the accelerators hereinbefore referred to being easily capable of providing this required radial velocity.

It should be noted that while an efficiency of 5% was assumed as the desired efficiency in the foregoing analysis, it is to be expressly noted that the fusion reactor of the invention can be mechanized to have any given efficiency. However, it should be noted that for efficiencies of less than ½ of 1% the energy required to accelerate the plasma particles will be greater than the energy released by the resulting fusion events.

Considering with more particularly the relative magnitudes of the various interrelated parameters of an accelerator system of the Hansen type capable of meeting the requirements of the embodiment of the invention heretofore discussed, the following table sets forth the detailed parameters of such an accelerator.

*Table I*

| | |
|---|---|
| Average mean flow | $1.91 \times 10^{-6}$ kg./sec. |
| Pulse repetition rate | 1 cycle per second |
| Output velocity | $1.62 \times 10^6$ meters/sec. |
| Mass of each plasma burst | $1.91 \times 10^{-6}$ kg. |
| Number of D and T atoms in each plasmoid | $2.3 \times 10^{20}$. |
| Energy of each burst | $2.5 \times 10^6$ joules. |
| Length of accelerator | 100 meters. |
| Number of field windings | 4000. |
| Duration of acceleration of each burst | 61.8 microseconds. |
| Duty cycle | 0.000062. |
| Average acceleration | $2.64 \times 10^{10}$ meters/sec.$^{-2}$. |
| Averace mechanical force | $5.04 \times 10^4$ newtons. |
| Average accelerating magnetic field | 0.4 weber/m.$^{-2}$. |
| Average ring current in plasma | $1.26 \times 10^5$ amps. |
| Pulse power demand | $4.05 \times 10^4$ megawatts (each acceleration). |
| Average output power | 2.5 megawatts (each acceleration). |

Continuing with the discussion of the invention, it can be shown that the energy needed to accelerate each pair of D–T nuclei is equal to 68.7 kev. Thus, if a 5% fusion probability is achieved and one out of every 20 pairs of nuceli fuse, the total energy supplied per fusion event is 1.37 mev. When it is remembered that the energy output per fusion event is 17.7 mev. for each deuterium-tritium pair, it is clear that the energy output-input ratio is 13:1. Hence, the energy output is substantially greater than the energy input so that energy is available for useful purposes even if a large amount of output energy is lost.

Referring now to shield 37, heat exchanger 33, and power generator 35, as has been hereinbefore discussed, these components are operable for converting the energy released by the fusion reactions to electrical energy which can be easily transported and utilized by conventional electrical engineering techniques. The major portion of the energy released by the fusion reactions is carried by the escaping neutrons and is converted to electrical energy by trapping or absorbing the neutrons in graphite shield 37 and by communicating the heat produced thereby through heat exchanger 33 to conventional steam operated electrical power generator 35. Since the process of absorbing or trapping neutrons and producing electricity from the heat produced thereby is well known in the prior art and numerous techniques and apparatus for accomplishing this are also well known in the art, a detailed discussion of the components 33, 37, and 35 is omitted.

As has been heretofore explained, approximately 80% of the energy released by the fusion process is posessed by the escaping neutrons so that the energy converted by shield 37, exchanger 33, and generator 35 is many times the input energy. For example, as has been heretofore mentioned, the output energy of the overall fusion reaction is some 13 times that of the input energy so that 80% of this figure is some 10½ times the input energy.

It should be clear from the foregoing that numerous modifications and alterations may be made in the preferred embodiment of the invention. For example, if it should be desired to utilize the total energy output of the reactor, the energy output which is imparted to the charged particles such as the helium nuceli and the electrons could be converted by winding a field winding around the collision area and passing a current therethrough whereby a magnetic field is generated in the collision area. Preferably, the field coil should be oriented so that the magnetic field force lines are parallel with the accelerating axes of the accelerometers so as not to affect the path of the plasmas before collision. As is apparent, the charged particles moving out radially from the collision area will cut the lines of magnetic flux generated by the field coil thereby inducing a current within the expanding shell of charged particles which current is perpendicular to both the field and the outwardly directed particle velocity. The induced currents in the expanding shell of charged particles moving out from the explosion area tend to slow down or stop the movement of the particles and concomitantly induce electromotive force in the field coils. It should be noted that this process is just the reverse of the process used to accelerate the plasmas in that an electric voltage is being generated by decelerating a plasma while in the accelerators an electric voltage is utilized to accelerate a plasma. It should also be noted that since the neutrons are electrically neutral their movement is not affected by the magnetic field. Hence, the method of extracting energy therefrom is not changed by the addition of the field coil around the collision area.

Continuing with the discussion of the invention, the preferred embodiment of FIGURE 1 can also be modified to utilize the electrical power output of terminals 23 to supply the electrical energy necessary to operate accelerators 13 and 17, thus eliminating the necessity of portions of sources 29 and 31.

In addition, the preferred embodiment of the invention as shown in FIGURE 1 can be modified so that the accelerating axes of the two accelerating structures are not collinear. This orientation of the accelerating structures may be desirable in special cases where the discharge apertures of the accelerating structures are positioned relatively close to one another so that the possibility of the plasma mass of one accelerating structure passing through the collision area and entering the other accelerating structure through its discharge aperture is completely eliminated.

Continuing with the discussion of the invention, there is shown in FIGURE 2 a second embodiment of the invention wherein accelerating axis A—A, of accelerating structure 13 and accelerating axis B—B of accelerating structure 7 are oriented so that they intersect but are not collinear.

As indicated in FIGURE 2, the path of the plasma from structure 13 converges until it reaches collision point 19 and then commences to diverge. In a like manner, the path of the plasma structure 17 converges until it reaches collision point 19 and then also diverges. However, since the accelerating axes of the two accelerating structures are not collinear, the diverging particles of the plasma from structure 13 which do not collide at point 19 pass adjacent accelerating structure 17 rather than into the accelerating structure while the plasma from structure 17 passes in a like manner adjacent accelerating structure 13. Accordingly, the embodiment shown in FIGURE 2 can be used under circumstances where the probability is great that a substantial number of plasma particles will pass through the collision point and continue into the oppositely disposed accelerating structure if the accelerating axes were collinear. For example, this would be the case in mechanizations of the invention where the discharge apertures of the two accelerating structures are positioned relatively close to one another and the collision point.

Examining a further modification of the invention, attention is directed to FIGURES 3 and 4 wherein there is shown a top view and a side sectional view of a modified fusion reactor of the invention. As shown in FIGURE 3, the reactor includes an annular-shaped accelerating structure which is operable to accelerate a plasma ring concentrically positioned with and within the accelerating structure toward the center of the accelerator whereby the oppositely disposed portions of plasma ring collide with one another with oppositely directed velocities.

As is indicated in FIGURES 3 and 4, the accelerating structure includes a pair of annular plates 39 and 41 forming the top and bottom sections, respectively, of the structure and a circular manifold 43 positioned between and adjacent the peripheries of the plates. As shown in FIGURE 3, manifold 43 is connected to gas source 25, through ionizing chamber 27. The manifold is operable for introducing the ionized gas or plasma peripherally between the annular plates by means of a plurality of apertures 44, shown in FIG. 4. In addition, as is shown in FIGURES 3 and 4, there is wound upon annular plate 39 a plurality of concentric annular coils or windings 40 while there is wound upon plate 41 a similar plurality of annular windings 42 in registry with the windings on plate 39.

In operation, the accelerating structure operates in substantially the same manner as in the preferred embodiment of the invention, the electric signals from source 29 being sequentially applied simultaneously to the coils in registry commencing with the coils furthest from the center and ending with the coil nearest the center whereby the annular plasma ring is uniformly accelerated toward the center of the accelerating structure. It is clear that as all portions of the ring are accelerated toward the center of the accelerating structure, the radius of the plasma ring becomes smaller and smaller so that the plasma ring converges to a body having an extremely small frontal area at the center point. Furthermore, it is clear that oppositely disposed particles within the plasma will be accelerated toward each other with oppositely directed velocities and will collide with one another at or near the center with relative velocities equal to twice their actual velocities.

It should be clear from the foregoing discussion that other alternative embodiments of the invention may be devised without departing from the basic concepts of the invention as herein set forth. For example, numerous fusion fuels can be used with the reactor of the invention instead of the deuterium-tritium gases herein mentioned. More particularly, the nuclei of a deuterium gas plasma can be fused with the nuclei of another deuterium gas plasma to form tritium nuclei of helium 3 nuclei and neutrons. Furthermore, is is not necessary that both of the fusing particles be accelerated, it being clear that one plasma mass or group of particles can be accelerated to a sufficient velocity so that upon being directed toward another stationary plasma mass or group of particles sufficient energy will be imparted to the fusing particles to maintain a self-sustaining fusion reaction.

In addition, it is evident that a number of pairs of accelerators can be mechanized for projecting their plasma pairs to collide at the same collision point either to increase the frequency of plasma collisions or to increase the number of plasma particles taking part in a single collision period.

Accordingly, it is to be expressly understood that the spirit and scope of the invention is to be limited only by the scope of the appended claims.

What is claimed as new is:

1. In a nuclear fusion reactor for generating energy from a nuclear fusion process resulting from the collision of first and second plasma masses, the combination comprising: a first plasma accelerator including apparatus for positioning the first plasma mass therein and operable for accelerating the first plasma mass along a first accelerating axis, said accelerator discharging the plasma mass having a toroidal shape with its plane substantially normal to said first accelerating axis; and a second plasma accelerator including apparatus for positioning the second plasma mass therein and operable for accelerating the second plasma mass along a second accelerating axis, said accelerator discharging the second plasma mass having a toroidal shape with its plane substantially normal to said second accelerating axis, said second accelerator being positioned relative to said first accelerator for orienting said second accelerating axis contiguous with said first accelerating axis at a preselected point whereby the first and second plasma masses contact one another at and around the preselected point.

2. The combination defined in claim 1 wherein said first plasma accelerator includes means for generating a first accelerating magnetic field around the first plasma mass to induce a circulating current in the first plasma mass in such a manner that the first plasma mass and said first magnetic field coact to accelerate the mass along with said first magnetic field, said first magnetic field being accelerated along said first accelerating axis.

3. The combination defined in claim 2 wherein said second accelerator includes means for generating a second accelerating magnetic field around the second plasma mass to induce a circulating current in the second plasma mass, said second accelerating magnetic field accelerating along said second accelerating axis, the second plasma mass being responsive to said circulating current therein for taking the toroidal configuration with its plane substantially normal to said second accelerating axis, said second magnetic field having a radial component parallel to the plane of the second plasma mass whereby said current in the second plasma mass and said second magnetic field coact to accelerate the second plasma mass along said second accelerating axis with said second magnetic field.

4. A nuclear fusion reactor, said reactor comprising: a first plasma accelerator including means for providing a first plasma mass therein and actuatable for accelerating said first plasma mass along an accelerating axis to discharge said first plasma mass from said first plasma accelerator with a first predetermined translational velocity, said first plasma mass being discharged in the form of a toroid having its plane substantially normal to said first accelerating axis; a second plasma accelerator including means for providing a second plasma mass therein and actuatable for accelerating said second plasma mass along an accelerating axis to discharge said second plasma mass from said second plasma accelerator with a second predetermined translational velocity, said second plasma mass being discharged in the form of a toroid having its plane substantially normal to said second accelerating axis, said second plasma accelerator being positioned relative to said first plasma accelerator for locating said second accelerating axis substantially contiguous to said first acclerating axis at a preselected point, said first predetermined velocity being determined relative to said second predetermined velocity to impart to said plasma masses sufficient energy to produce fusion reactions between portions of the plasma masses upon contact with each other; actuating means for actuating said first and second plasma accelerators, said first accelerator being actuated with respect to the time of actuation of said second plasma accelerator in a predetermined manner to permit said first and second plasma masses to contact each other at and near said preselected point; and energy extracting means for tapping the energy produced by the fusion reaction resulting from the contact of the plasma masses.

5. The combination defined in claim 4 wherein said first and second plasma accelerators each include apparatus for imparting a radial velocity to said first and second plasma masses, respectively, whereby each of the plasma masses converges to a relatively small body in the vicinity of said preselected point.

6. In a nuclear fusion reactor for generating energy through a process of nuclear fusion, the combination comprising: a first plasma accelerator including an evacuated envelope having an input and an output end and means for providing a first mass of gas plasma in said envelope at said input end, said first plasma accelerator further including magnetic field generating means for generating an accelerating magnetic field within said envelope to induce a circulating current in said first plasma mass and to exert a magnetomotive force upon said first plasma mass for accelerating said first plasma mass through said envelope along a first accelerating axis toward said output end; a second plasma accelerator including an evacuated envelope having an input end and an output end and means for providing a second mass of gas plasma in said envelope at said input end, said second plasma accelerator further including magnetic field generating means for generating an accelerating magnetic field within said envelope to induce a circulating current in said second plasma mass and to exert a magnetomotive force upon said second plasma mass for accelerating said second plasma mass through said envelope along a second accelerating axis toward said output end, said second accelerator being oriented with respect to said first accelerator for positioning said second accelerating axis substantially contiguous with said first accelerating axis at a preselected collision point whereby said first and second plasma masses collide with one another in the area around the preselected collision point.

7. The combination defined in claim 6 which further includes apparatus for positioning the output ends of said accelerators at preselected distances from the preselected collision point.

8. In a nuclear fusion reactor for generating energy through a process of nuclear fusion, the combination comprising: a plurality of plasma accelerators, each of said accelerators including an input point and a discharge aperture and a plurality of field windings positioned between said input point and said discharge aperture for producing a magnetic field therebetween, each of said accelerators further including means for positioning a plasma mass in said accelerator at said input point, each of said accelerators being operable in response to energization of its field windings for accelerating the plasma mass therein along an accelerating axis and discharging the plasma mass at said discharge aperture, said accelerators being positioned with their accelerating axes substantially intersecting at a preselected point so that said plasma masses collide within the area surrounding said preselected point; and actuating means for energizing said field windings of each of said accelerators sequentially from said input point to said discharge aperture to produce a magnetic field phase front in each accelerator accelerating through each accelerator from said input point to said discharge aperture, said magnetic field of each accelerator inducing a circular current in the plasma mass therein which reacts with said magnetic field to produce an accelerating force which advances the plasma mass through the accelerator substantially in accordance with the movement of said magnetic field phase front.

9. A nuclear fusion reactor, said reactor comprising: a first plasma accelerator including means for providing a first plasma mass therein and actuatable for accelerating said first plasma mass along an accelerating axis to discharge said first plasma mass from said first plasma accelerator with a high velocity, said first plasma mass being discharged in the form of a toroid having its plane substantially normal to said first accelerating axis; a second plasma accelerator including means for providing a second plasma mass therein and actuatable for accelerating said second plasma mass along an accelerating axis to discharge said second plasma mass from said second plasma accelerator with a high velocity, said second plasma mass being discharged in the form of a toroid having its plane substantially normal to said second accelerating axis, said second plasma accelerator being positioned relative to said first plasma accelerator for locating said second accelerating axis contiguous to said first accelerating axis at a preselected point; actuating means for actuating said first plasma accelerator with respect to the time of actuation of said second plasma accelerator in a predetermined manner such that said first and second plasma masses contact each other at and near said preselected point.

10. The combination defined in claim 9 wherein said accelerators include apparatus for imparting a radial velocity to said plasma masses whereby the masses tend to converge to a relatively small body at the preselected point.

References Cited in the file of this patent

UNITED STATES PATENTS

| | | |
|---|---|---|
| 2,940,011 | Kolb | June 7, 1960 |
| 2,992,345 | Hansen | July 11, 1961 |
| 2,997,436 | Little et al. | Aug. 22, 1961 |

FOREIGN PATENTS

| | | |
|---|---|---|
| 637,866 | Great Britain | May 31, 1950 |
| 876,279 | Germany | May 11, 1953 |
| 1,068,824 | Germany | Nov. 12, 1959 |

OTHER REFERENCES

Reviews of Modern Physics, vol. 28, No. 3, July 1956, pp. 338, 339, 359, 360.

Project Sherwood by A. S. Bishop, Addison-Wesley Pub. Co., Reading, Mass., 1958, pp. 25–32, 48–52, 61–64, 169–171.

Controlled Thermonuclear Reactions by Samuel Glasstone, D. Van Nostrand Co., N.Y., 1960, pp. 65, 66, 67, 68, 25, 26, 27, 28, 29.